R. L. BELTON.
PROTECTIVE LINER FOR PNEUMATIC TIRES.
APPLICATION FILED SEPT. 19, 1917.
1,273,446.
Patented July 23, 1918.
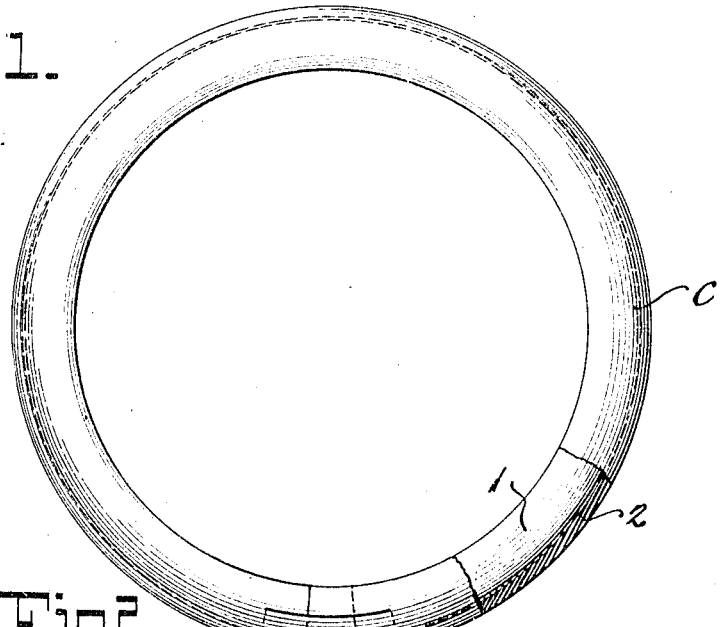
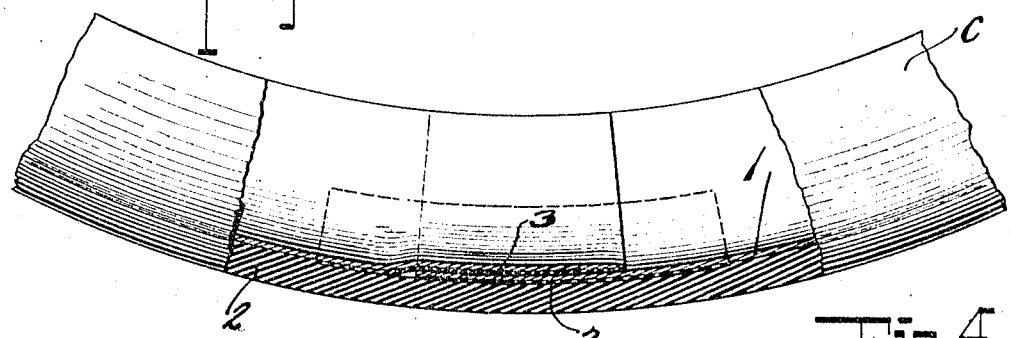
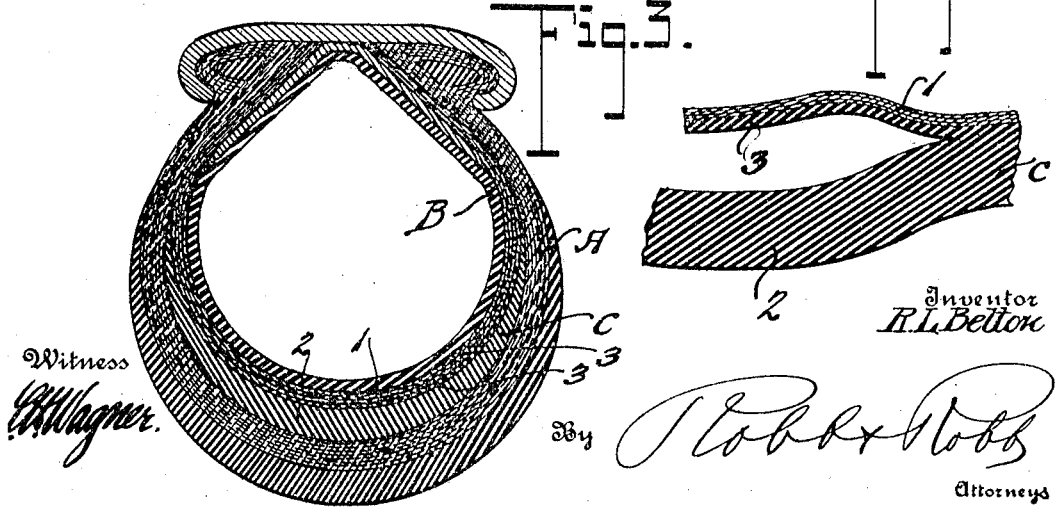
Inventor
R. L. Belton

UNITED STATES PATENT OFFICE.

ROBERT L. BELTON, OF DAYTON, OHIO.

PROTECTIVE LINER FOR PNEUMATIC TIRES.

1,273,446.  Specification of Letters Patent.  Patented July 23, 1918.

Application filed September 19, 1917. Serial No. 192,120.

*To all whom it may concern:*

Be it known that I, ROBERT L. BELTON, a citizen of the United States, residing at Dayton, in the county of Montgomery and State of Ohio, have invented certain new and useful Improvements in Protective Liners for Pneumatic Tires, of which the following is a specification.

The present invention has to do with protective devices generally known as liners for pnuematic tires and it has for its primary object to provide a novel article of manufacture constructed of a non-elastic body having applied thereto a cushioning substance, such as rubber, for interposition between the inner tube and the outer shoe of the tire whereby protection to the latter against damage by friction, stone bruising or under inflation, is afforded.

A further object in view is the application of the aforesaid cushioning material to the liner body which is of the known continuous ring type, in such manner that the material will provide an elastic connection for the ends of the body and the latter may be extended for use with tires varying from standard to ten and one-fifth per cent. over size.

With the above and other objects in view, this invention consists in the construction, combination, and arrangement of parts all as hereinafter more fully described, claimed and illustrated in the accompanying drawings, wherein:

Figure 1 is a side elevation of an embodiment of this invention, a portion being broken away and shown in section;

Fig. 2 is an enlarged fragmentary view of the device at the juncture of the ends of the fabric body, a portion being broken away to show more clearly the overlapping extremities;

Fig. 3 is a sectional view through a tire having my protective device applied thereto; and Fig. 4 is an enlarged fragmentary view of the liner, showing more clearly the construction of the same at an end of the liner.

Referring to the drawings and especially to Fig. 3, A designates the usual outer shoe or casing of a vehicle tire, B the inner tube and C the protective liner interposed between these parts. The liner consists of a fabric body of usual construction and composed of one or more layers of fabric material as indicated at 1, the ends of said fabric body overlapping a suitable distance as indicated most clearly in Fig. 2. To the tread portion of such fabric is applied by any of the well known means a relatively thick cushion of rubber 2. This rubber is applied permanently to the tread of the surface and extends more or less around the tire so as to cover a portion of the side walls thereof. The rubber material is thickest at the center of the tread and becomes thinner toward each side. The fabric body 1 extends down the side walls of the tire so as to protect or strengthen the latter.

One of the essential features of this invention is the application of the rubber cushion tread to the body so as to be continuous, and therefore such rubber provides an elastic connection between the ends of the fabric. The rubber material is of such elasticity as to permit the liner to be extended for over size tires and from a manufacturing standpoint as well as from the standpoint of the user the use of the protective device is considerably enlarged.

Another special feature of the liner is the provision of a layer of rubber upon the overlapping ends of the fabric as indicated at 3. The object of this is to preclude the movement of the overlapping ends which movement would cause friction and in time damage the tube with which the liner is used.

The substantially thick cushion which is afforded by the rubber C on the liner protects the casing from the damage due to impingement with curb-stones or other objects which would cause the fabric of the casing to give way and such cushion also protects the casing where the tire is under inflated. By reason of the characteristics of the rubber it is quite obvious also that the liner cannot creep in its use and thereby set up friction which would also damage the casing.

Having thus described the invention, what is claimed as new is:—

1. As a new article of manufacture, a liner for pneumatic tires having united therewith a continuous elastic tread, said tread forming an elastic connection for the ends of the liner.

2. As a new article of manufacture, a liner for pneumatic tires consisting of a fabric body having its ends overlapping, and a layer of rubber applied to the tread portion of the fabric and overlying the overlapping ends aforesaid but free from said ends, said rubber constituting an elastic connection for the ends of the fabric.

3. As a new article of manufacture, an inner liner adapted for removable application to pneumatic tires, said liner having a continuous elastic tread, said tread forming an elastic connection for the ends of the liner whereby to admit of circumferential expansion in tires of different diamaters.

4. As a new article of manufacture, a liner for pneumatic tires consisting of an open ring composed of a series of layers of non-elastic material and an outer layer of thick elastic material permanently adhered to the tread portion of the non-elastic material excepting at the end portions of the frabic, said outer layer constituting an elastic connection permitting the liner to expand for over size tires.

5. As a new article of manufacture, a liner for pneumatic tires consisting of a fabric body having its ends overlapping, said ends being coated with friction eliminating material, and a rubber tread permanently adhered to the fabric excepting at the ends thereof but extending over said ends to prevent penetration at said ends and forming a connection therefor.

In testimony whereof I affix my signature.

ROBERT L. BELTON.